(12) United States Patent
Yang

(10) Patent No.: US 10,740,194 B2
(45) Date of Patent: Aug. 11, 2020

(54) VIRTUAL MACHINE DEPLOYMENT METHOD AND APPARATUS

(71) Applicant: ALIBABA GROUP HOLDING LIMITED, George Town, Grand Cayman (KY)

(72) Inventor: Jirong Yang, Hangzhou (CN)

(73) Assignee: ALIBABA GROUP HOLDING LIMITED, George Town, Grand Cayman (KY)

( * ) Notice: Subject to any disclaimer, the term of this patent is extended or adjusted under 35 U.S.C. 154(b) by 81 days.

(21) Appl. No.: 16/054,858

(22) Filed: Aug. 3, 2018

(65) Prior Publication Data

US 2018/0341559 A1 Nov. 29, 2018

Related U.S. Application Data

(63) Continuation of application No. PCT/CN2017/071831, filed on Jan. 20, 2017.

(30) Foreign Application Priority Data

Feb. 3, 2016 (CN) .......................... 2016 1 0077964

(51) Int. Cl.
*G06F 11/14* (2006.01)
*G06F 9/455* (2018.01)
*G06F 9/50* (2006.01)

(52) U.S. Cl.
CPC ...... *G06F 11/1469* (2013.01); *G06F 9/45533* (2013.01); *G06F 9/45558* (2013.01);
(Continued)

(58) Field of Classification Search
CPC ............. G06F 9/45533; G06F 9/45558; G06F 9/5027; G06F 9/505; G06F 9/5077; G06F 11/1469; G06F 11/1446; G06F 11/1456
See application file for complete search history.

(56) References Cited

U.S. PATENT DOCUMENTS

2008/0222633 A1 9/2008 Kami
2012/0054739 A1* 3/2012 Arakawa ............... G06F 9/455
718/1

(Continued)

FOREIGN PATENT DOCUMENTS

CN 102981890 A 3/2013
CN 102981910 A 3/2013
(Continued)

OTHER PUBLICATIONS

International Preliminary Report, International Search Report and Written Opinion of the International Searching Authority issued in related International PCT Application No. PCT/CN2017/071831; dated Apr. 26, 2017 (7 pgs.).
(Continued)

*Primary Examiner* — Ryan Bertram
(74) *Attorney, Agent, or Firm* — Finnegan, Henderson, Farabow, Garrett & Dunner, LLP

(57) ABSTRACT

The present disclosure provides virtual machine deployment methods and apparatuses. One exemplary virtual machine deployment method comprises: acquiring a fragment node by scrambling and fragmenting to-be-processed data; allocating a target virtual machine to the fragment node according to the data amount of the fragment node; and deploying the fragment node onto the target virtual machine. According to some embodiments of the present disclosure, when a virtual machine is allocated to a fragment node, the data amount of the fragment node can be controlled firstly by scrambling data. Then a virtual machine matching the data amount can be allocated according to the actual data amount of the fragment node, so as to prevent the virtual machine from overloading, thereby achieving better load balancing.

25 Claims, 8 Drawing Sheets

(52) U.S. Cl.
CPC ............ *G06F 9/505* (2013.01); *G06F 9/5027* (2013.01); *G06F 9/5077* (2013.01); *G06F 11/1446* (2013.01); *G06F 11/1456* (2013.01); *G06F 2009/4557* (2013.01); *G06F 2009/45575* (2013.01)

(56) References Cited

U.S. PATENT DOCUMENTS

| | | | |
|---|---|---|---|
| 2012/0084597 | A1 | 4/2012 | Yasui et al. |
| 2012/0179446 | A1* | 7/2012 | Tylutki ................ G06F 11/3442 703/21 |
| 2013/0291118 | A1* | 10/2013 | Li ........................... G06F 21/60 726/26 |
| 2013/0318525 | A1* | 11/2013 | Palanisamy ........... G06F 9/5066 718/1 |
| 2014/0136803 | A1* | 5/2014 | Qin ........................ G06F 3/065 711/162 |
| 2014/0282550 | A1 | 9/2014 | Blumenfeld et al. |
| 2014/0330889 | A1* | 11/2014 | Brasche .............. H04L 67/1095 709/203 |
| 2015/0095910 | A1 | 4/2015 | Ge et al. |
| 2015/0199208 | A1* | 7/2015 | Huang .................. G06F 9/5072 718/1 |
| 2015/0220442 | A1* | 8/2015 | Phelan .................. G06F 12/084 711/123 |
| 2015/0363239 | A1 | 12/2015 | Hsu et al. |
| 2016/0134881 | A1* | 5/2016 | Wang .................. H04N 19/436 375/240.02 |
| 2017/0206372 | A1* | 7/2017 | Jung .................... H04L 63/0807 |
| 2017/0220949 | A1* | 8/2017 | Feng ...................... G06N 20/00 |
| 2017/0322793 | A1* | 11/2017 | Ran ........................... G06F 8/65 |
| 2018/0011865 | A1* | 1/2018 | Bowman ............... G06F 21/602 |
| 2018/0293075 | A1* | 10/2018 | Liu ........................... G06F 9/38 |

FOREIGN PATENT DOCUMENTS

| | | |
|---|---|---|
| CN | 103970612 A | 8/2014 |
| WO | WO 2014/140697 A1 | 9/2014 |
| WO | WO 2017/133484 A1 | 8/2017 |

OTHER PUBLICATIONS

Extended European Search Report pursuant to Rule 62 EPC, the Supplementary European Search Report (Art. 153(7) EPC) and the European Search Opinion issued in related International Application No. 17746804.8-1224 / 3413193; dated Jan. 15, 2019 (5 pgs.).

\* cited by examiner

VIRTUAL MACHINE DEPLOYMENT METHOD AND APPARATUS

This application claims priority to International Application No. PCT/CN2017/071831, filed on Jan. 20, 2017, which claims priority to and the benefits of priority to Chinese Application No. 201610077964.5, filed on Feb. 3, 2016, both of which are incorporated herein by reference in their entireties.

TECHNICAL FIELD

The present disclosure generally relates to the technical field of computers, and in particular, to virtual machine deployment methods and apparatuses.

BACKGROUND

With the rapid development of the Internet, innovative computing modes have been adopted in cloud computing to enable users to benefit from almost infinite computing capabilities and the availability of various information services at any time. Cloud computing integrates virtualization technology. The scalability and flexibility of virtualization technology helps to increase the resource utilization rates and reduce the costs. For example, for a physical machine having 32 cores, 30 virtual machines can be allocated. In situations where each virtual machine needs 4 cores, theoretically the physical machine would need to have 120 cores to create 30 virtual machines, but in fact the physical machine has only 32 cores. In practical applications, not all services can be in a full-load state at the same time. To reduce costs and increase the resource utilization rates, cores in a low-load state can be shared in cloud computing to achieve the objectives of creating 30 virtual machines on one physical machine.

With the above virtualization method, a large amount of data may share one virtual machine, which may lead to an excessively high load on that virtual machine. For example, in Taobao™ applications, a flagship store can have significantly more commodities than an ordinary store, and a higher search popularity as well. When the above virtualization method is used, commodity data of multiple flagship stores may be deployed onto one virtual machine. When a large number of buyers conduct searches based on merchants/stores, the virtual machine where multiple flagship stores are deployed bears a heavy load.

SUMMARY

In view of the above, one of the problems with the existing virtualization methods is that a large amount of data can be deployed onto one virtual machine and cause a heavy load on that virtual machine. The present disclosure provides virtual machine deployment methods and apparatuses. One objective of embodiments of the present disclosure is to address the above problems.

According to some embodiments of the present disclosure, virtual machines deployment methods are provided. One exemplary method comprises: acquiring a fragment node by scrambling and fragmenting to-be-processed data; allocating a target virtual machine to the fragment node according to the data amount of the fragment node; and deploying the fragment node onto the target virtual machine.

According to some embodiments of the present disclosure, virtual machine deployment apparatuses are provided. One exemplary virtual machine deployment apparatus comprises: a scrambling module configured to acquire a fragment node by scrambling and fragmenting to-be-processed data; an allocating module configured to allocate a target virtual machine to the fragment node according to the data amount of the fragment node; and a deployment module configured to deploy the fragment node onto the target virtual machine.

According to some virtual machine deployment methods and apparatuses of the present disclosure, a fragment node can be acquired by scrambling and fragmenting to-be-processed data. A target virtual machine can be allocated to the fragment node according to the data amount of the fragment node. The fragment node can be deployed onto the target virtual machine. According to some embodiments, when a virtual machine is allocated to a fragment node, the data amount of the fragment node is controlled by scrambling data. A virtual machine matching the data amount can then be selected, thereby preventing the virtual machine from being overloaded. That way, load balancing can be achieved.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods according to some embodiments of the present disclosure, the scope of which is defined by the appended claims.

Figure 1:
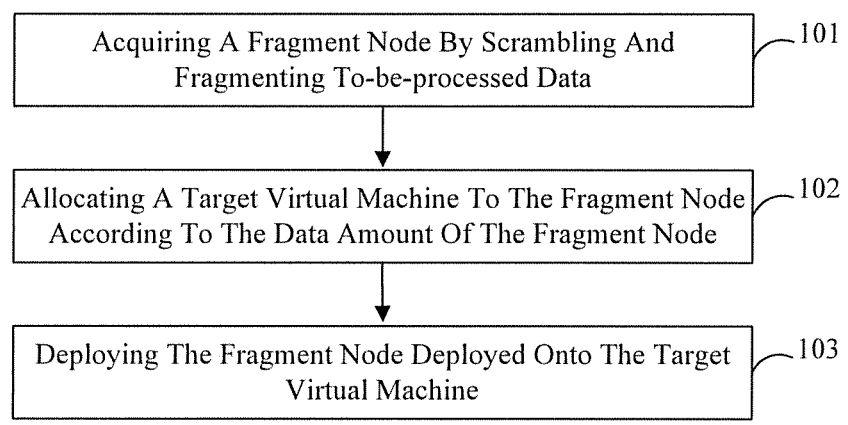
FIG. 1 is a schematic flowchart of an exemplary virtual machine deployment method according to some of the present disclosure.

Exemplary virtual machine deployment methods and apparatuses provided in the embodiments of the present disclosure are described in detail below with reference to the accompanying drawings. FIG. 1 is a schematic flowchart of an exemplary virtual machine deployment method 100 according to some embodiments of the present disclosure. As shown in FIG. 1, the exemplary virtual machine deployment method 100 includes at least steps 101-103.

In step 101, a fragment node is acquired by scrambling and fragmenting to-be-processed data. In practical applications, to store data, big data can be scrambled and fragmented for distributed storage. That way, each storage device stores a relatively small amount of data, thereby reducing the load of the storage device.

In some embodiments, the to-be-processed data can be scrambled and fragmented according to a preset scrambling algorithm to acquire the fragment node. The fragment node represents scrambled fragment data. The number of fragments to be obtained after scrambling can be set according to the data amount of the to-be-processed data. Then, the to-be-processed data can be scrambled and fragmented based on a scrambling algorithm.

For example, the to-be-processed data includes 2 billion pieces of data and can be scrambled into 256 fragments. That is, 2 billion pieces of data can be scrambled into 256 fragment nodes. In a Taobao™ application scenario, commodity data can be scrambled and fragmented using a Hash algorithm. The data can then be stored based on fragment nodes acquired after scrambling.

In step 102, a target virtual machine is allocated to the fragment node according to the data amount of the fragment node.

The data amounts of the acquired fragment nodes can be different. After the fragment nodes are acquired, the data amount of each fragment node can be calculated. After the data amounts of the fragment nodes are acquired, a target virtual machine can be allocated to the fragment node. In some embodiments, the target virtual machine may need to have a processing capability sufficient for processing the data amount included in the fragment node. The processing capability may be represented by, for example, at least one of CPU, memory, and disk performance parameters.

In step 103, the fragment node is deployed onto the target virtual machine. After the target virtual machine is selected for the fragment node, the fragment node can be deployed onto the target virtual machine.

According to some virtual machine deployment methods provided in the present disclosure, a fragment node is acquired by scrambling and fragmenting to-be-processed data. A data amount corresponding to the fragment node can be calculated. A target virtual machine can be allocated to the fragment node according to the data amount of the fragment node. The fragment node can then be deployed onto the target virtual machine. In this exemplary method 100, when a virtual machine is allocated to a fragment node, the data amount of the fragment node is controlled firstly by scrambling data. Then a virtual machine matching the data amount is allocated so as to prevent the virtual machine from overloading, thereby achieving better load balancing.

Figure 2:
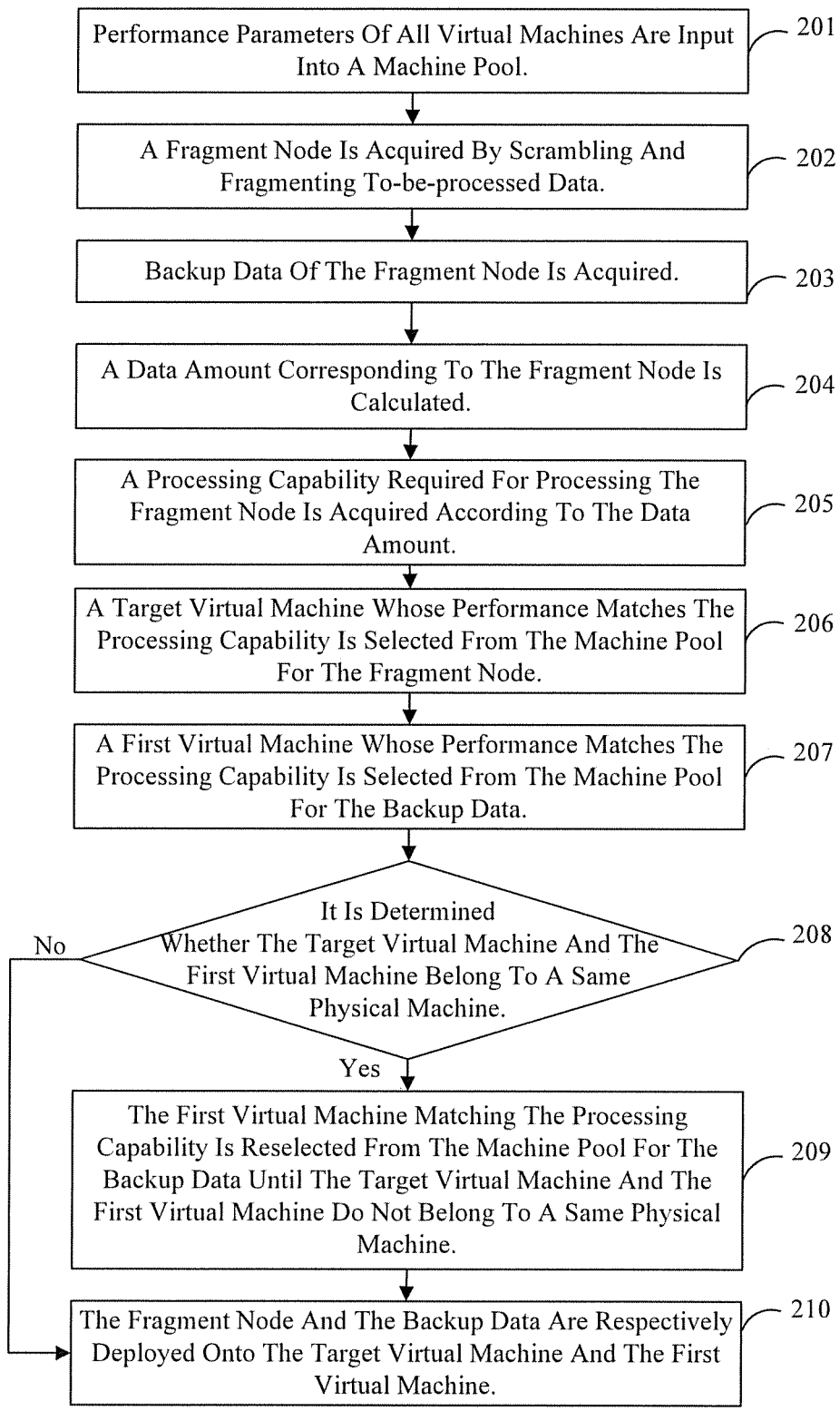
FIG. 2 is a schematic flowchart of an exemplary virtual machine deployment method according to some embodiments of the present disclosure.

FIG. 2 is a schematic flowchart of an exemplary virtual machine deployment method 200 according to some embodiments of the present disclosure. As shown in FIG. 2, the exemplary virtual machine deployment method 200 includes at least steps 201-210.

In step 201, performance parameters of all virtual machines are input into a machine pool. To facilitate virtual machine allocation, the performance parameters of all virtual machines can be input into a machine pool. The performance parameters of a virtual machine can include, for example, at least one of a memory size, a disk size, a number of cores, and the like.

In step 202, a fragment node is acquired by scrambling and fragmenting to-be-processed data.

In step 203, backup data of the fragment node is acquired. In some embodiments, the to-be-processed data can be scrambled and fragmented using a consistent Hash algorithm. The number of fragments to be obtained after scrambling can be set according to the data amount of the to-be-processed data. The to-be-processed data can then be scrambled and fragmented based on the consistent scrambling algorithm. To ensure data security, the fragment node may be backed up to acquire backup data of the fragment node.

Figure 3:
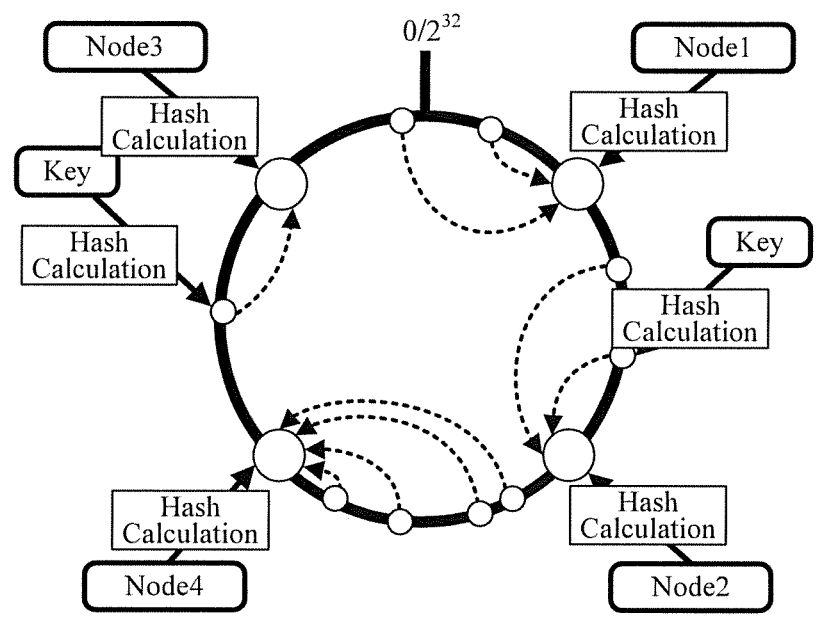
FIG. 3 is a schematic diagram of scrambling data using a consistent Hash algorithm according to some embodiments of the present disclosure.

FIG. 3 is a schematic diagram illustrating an exemplary process of scrambling data using a consistent Hash algorithm according to some embodiments of the present disclosure. For example, the consistent Hash algorithm maps a value to a 32-bit key, that is, a numerical space of 0 to 2^32−1. This space can be imagined as a ring having its head (0) and tail (2^32−1) connected (head (0) and (2^32) overlapping). The data can be mapped to specific nodes, for example, key % N, key being the key of the data and N being the number of nodes. In the example shown in FIG. 3, a big circle on the ring represents one node, and a small circle on the ring represents node data. Master data and backup data can be set corresponding to each node.

Figure 4:
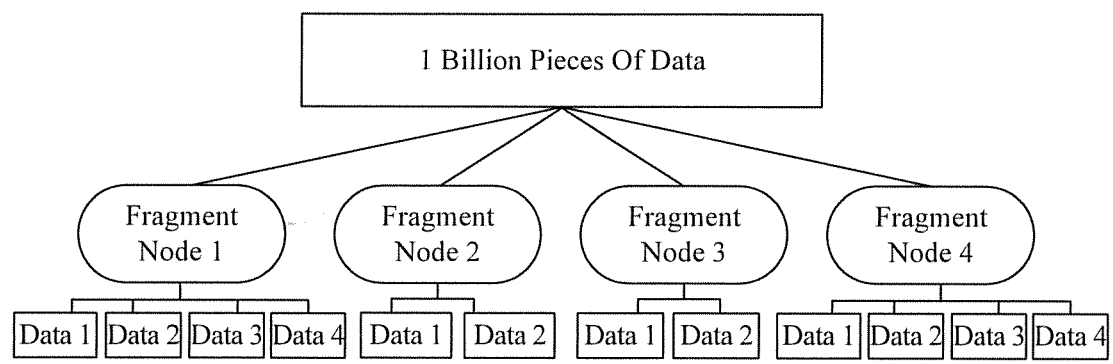
FIG. 4 is a schematic diagram illustrating a result of data scrambling according to some embodiments of the present disclosure.

As an example, there are 1 billion pieces of data that need to be scrambled. The data can be scrambled by using a consistent Hash algorithm to obtain a result as shown in FIG. 4. In FIG. 4, the 1 billion pieces of data are scrambled into four fragments, each fragment corresponding to one fragment node. To improve data security and to ensure service continuity, the data can be backed up. Multiple pieces of data are set under each fragment node, and the multiple pieces of data under the fragment node have an equal relationship. That is, the multiple pieces of data are master/backup data of each other. For example, a fragment node 1 includes data 1 to data 4, data 1, data 2, data 3 and data 4 being master/backup data of each other. A fragment node 2 includes data 1 to data 2, with data 1 and data 2 being master/backup data of each other.

In step 204, a data amount corresponding to the fragment node is calculated. In some embodiments, for example, the number of fields included in one piece of data in the fragment node, a field type corresponding to each field, the number of tables included in one piece of data, and the number of entries included in the fragment node can be acquired. The number of entries can indicate how many pieces of data are included in the fragment node. Further, the number of bits occupied by one piece of data can be calculated according to the number of fields included in one piece of data, the field type corresponding to each field, and the number of tables included in one piece of data. After a field type is acquired, the number of bits occupied by the field type can be obtained. For example, the integer (int) data type occupies 4 bytes, the long integer data type occupies 4 bytes, the double data type occupies 8 bytes, a character string (char) occupies 2 bytes, and so on. Further, the data amount of the fragment node can be calculated according to the number of entries and the number of bits occupied by one piece of data in the fragment node. The data amount of the fragment node can be obtained by multiplying the number of entries by the number of bits occupied by one piece of data.

Referring back to FIG. 2, in step 205, a processing capability required for processing the fragment node can be acquired according to the data amount.

The processing capability can be represented by, for example, at least one of CPU, memory, and disk performance parameters. In a search engine application scenario, the data amount of the fragment node can be acquired, and the processing capability required for processing the fragment node can be acquired according to the data amount. For example, a disk size needed by the fragment node can be calculated based on the acquired number of bits occupied by one piece of data, a preset search feature expansion coefficient, and a combined index coefficient. After the needed disk size is calculated, a memory size, and Central Processing Unit (CPU) performance needed by the fragment node may be acquired according to the disk size.

In practical applications, during index building, a larger number of index levels can indicate a longer time is required for searching and a higher degree of search difficulty, which is equivalent to the search being expanded. In some embodiments, a search feature expansion coefficient can be set in advance. The search feature expansion coefficient may be set based on application of related techniques. For example, when a Docvalue search method is adopted, search expansion coefficients of the disk and the memory can be respectively set to 1.17 and 0.85. In vsearch, the combined index coefficient can be slightly greater than 2.

In step 206, a target virtual machine whose performance matches the processing capability can be selected from the machine pool for the fragment node. The target virtual machine whose performance matches the processing capability can be selected from the machine pool according to the processing capability required for processing the fragment node. In some embodiments, the sizes of disk and memory corresponding to the target virtual machine can be calculated based on the disk and memory associated with the processing capability required for the fragment node and a preset coefficient. The disk and memory associated with the processing capability can be respectively multiplied by the preset coefficient to obtain the sizes of disk and memory of the target virtual machine. For example, the memory size needed by the fragment node=memory of the target virtual machine*75%, and the disk size needed by the fragment node=disk of the target virtual machine*75%. In the process of selecting the target virtual machine from the machine pool, the target virtual machine may be selected first from a low-configuration machine pool, and gradually move on to a high-configuration machine pool, to achieve an optimal configuration.

Figure 5:
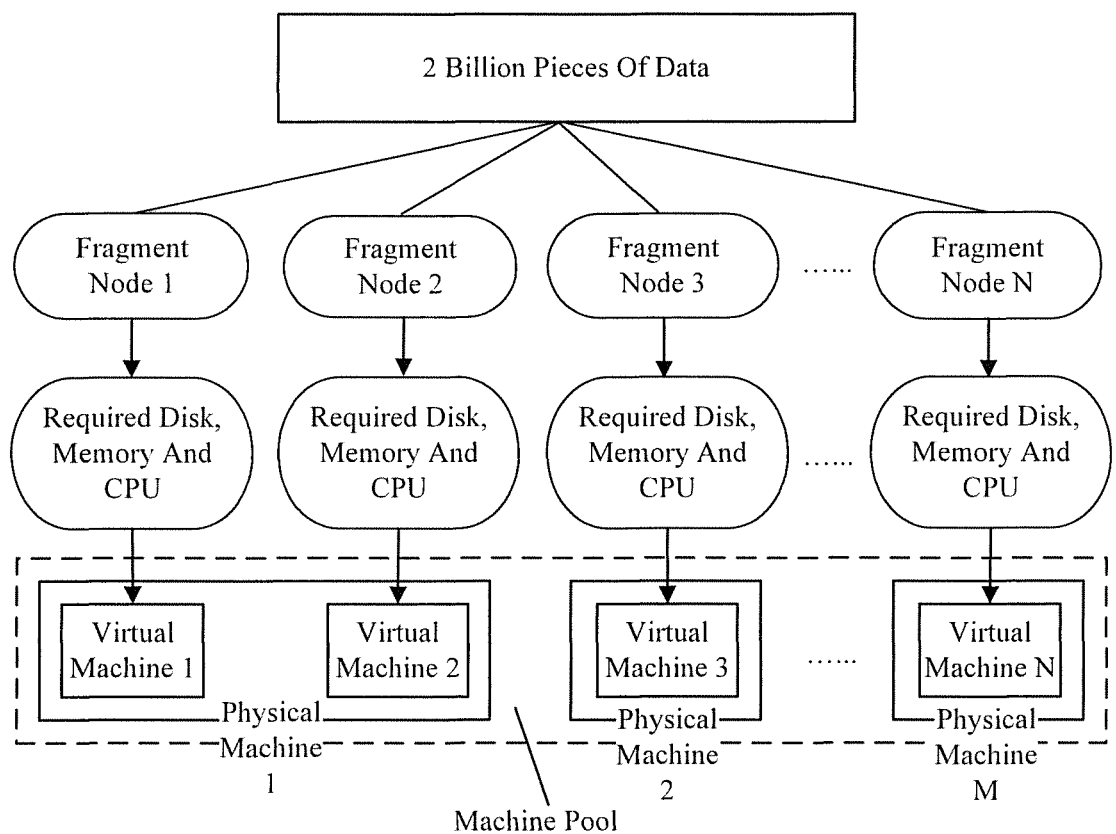
FIG. 5 is a schematic diagram illustrating application of an exemplary virtual machine deployment method according to some embodiments of the present disclosure.

FIG. 5 is a schematic diagram illustrating application of an exemplary virtual machine deployment method according to some embodiments of the present disclosure. As shown in FIG. 5, 2 billion pieces of data are scrambled into N fragments, each fragment corresponding to one fragment node. Before the data is backed up, a data amount corresponding to each fragment node can be calculated. A processing capability required for processing the fragment node can be obtained according to the acquired data amount. As shown in FIG. 5, in this example, the processing capability can include a disk size, a memory size, CPU performance and the like required for processing the fragment node. According to the required processing capability, a target virtual machine matching the fragment node can be acquired from the machine pool. In this example, there are M physical machines, and N virtual machines are created on the M physical machines, wherein M<N. Physical machine 1 includes virtual machine 1 and virtual machine 2, physical machine 2 includes virtual machine 3, physical machine 3 includes virtual machine 4, . . . , and physical machine M includes virtual machine N. Fragment node 1 is deployed on virtual machine 1, fragment node 2 is deployed on virtual machine 2, . . . , and fragment node N is deployed on virtual machine N.

Referring back to FIG. 2, in step 207, a first virtual machine whose performance matches the processing capability is selected from the machine pool for the backup data. In some embodiments, to improve data security and ensure service continuity, the fragment node can be backed up. A virtual machine can be allocated to the backup data of the fragment node while the target virtual machine is allocated to the fragment node. The backup data and the fragment node include identical data. A first virtual machine whose performance matches the processing capability can be selected from the machine pool according to the processing capability required for the fragment node, to serve as a virtual machine corresponding to the backup data.

In step 208, it is determined whether the target virtual machine and the first virtual machine belong to a same physical machine. During the process of virtual machine allocation, if the target virtual machine and the first virtual machine belong to a same physical machine, the data of the fragment node cannot be used to provide services if that physical machine fails. Therefore, there is a need for preventing the master and backup data from being allocated to virtual machines belonging to a same physical machine. In some embodiments, after the target virtual machine and the first virtual machine are selected, it can be further determined whether the target virtual machine and the first virtual machine belong to a same physical machine.

If it is determined that the target virtual machine and the first virtual machine belong to a same physical machine, step 209 can be performed. If it is determined that the target virtual machine and the first virtual machine do not belong to a same physical machine, step 210 can be performed.

In step 209, the first virtual machine matching the processing capability is reselected from the machine pool for the backup data. The reselection process can be repeated until the target virtual machine and the first virtual machine do not belong to a same physical machine.

If the target virtual machine and the first virtual machine belong to a same physical machine, in some embodiments, the first virtual machine can be reselected for the backup data until the selected first virtual machine and the target virtual machine do not belong to a same physical machine. That way, it helps to ensure that the backup data can continue to provide services in case the physical machine to which the target virtual machine belongs fails. After the first virtual machine is reselected, if the first virtual machine belongs to a different physical machine from that of the target virtual machine, step 210 can be performed.

In step 210, the fragment node and the backup data can be respectively deployed onto the target virtual machine and the first virtual machine.

Figure 6:
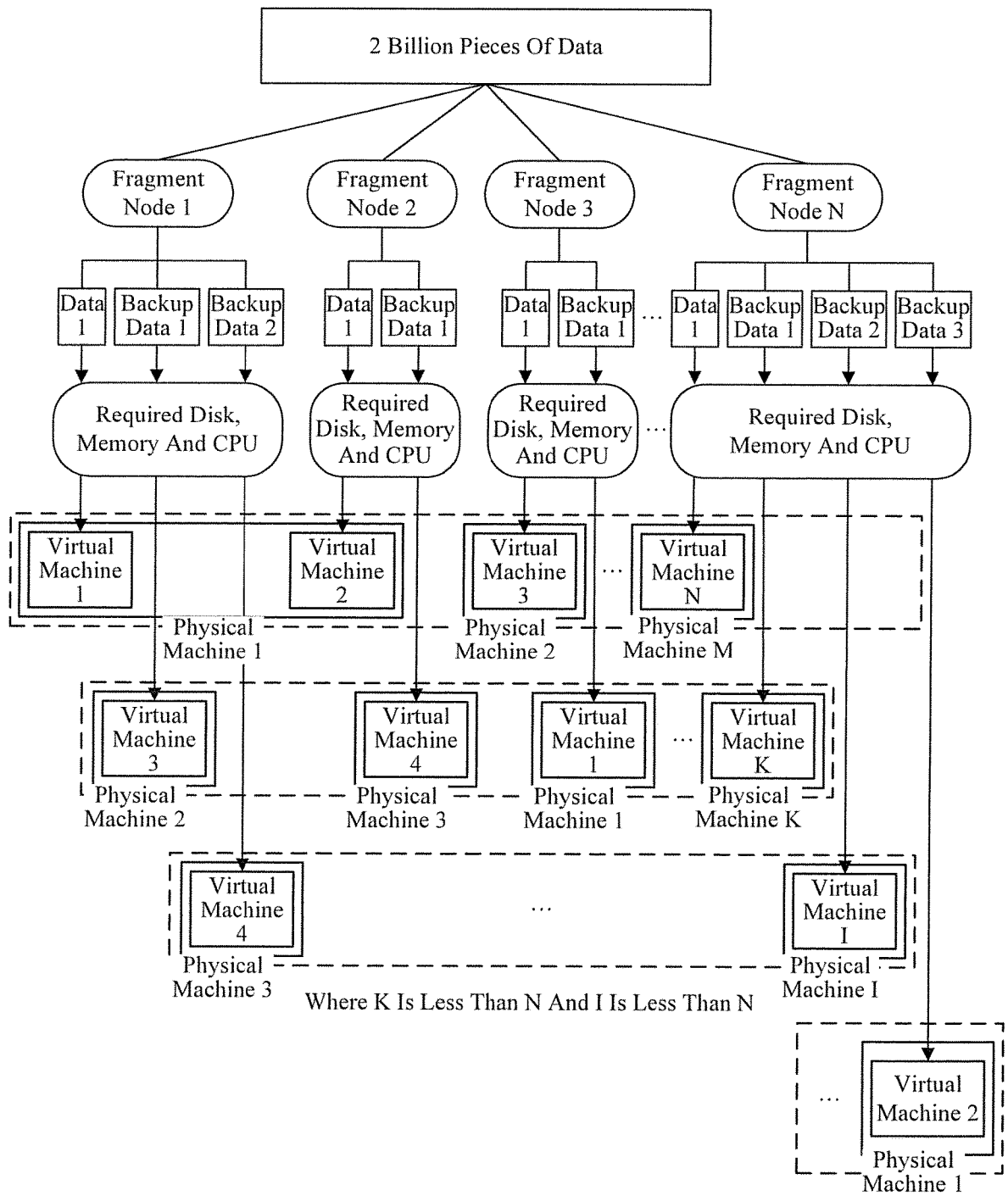
FIG. 6 is a schematic diagram illustrating application of an exemplary virtual machine deployment method according to some embodiments of the present disclosure.

FIG. 6 is a schematic diagram illustrating application of an exemplary virtual machine deployment method according to some embodiments of the present disclosure. As shown in FIG. 6, 2 billion pieces of data are scrambled into N fragments, each fragment corresponding to one fragment node. Each fragment node can include a plurality of pieces of backup data. For example, fragment node 1 includes data 1, backup data 1, and backup data 2; fragment node 2 includes data 1 and backup data 1; fragment node 3 includes data 1 and backup data 1; . . . and fragment node N includes data 1, and backup data 1 to backup data 3. In this example, there are M physical machines, and N virtual machines are created on the M physical machines, wherein M<N. Physical machine 1 includes virtual machine 1 and virtual machine 2, physical machine 2 includes virtual machine 3, physical machine 3 includes virtual machine 4, ..., and physical machine M includes virtual machine N.

When virtual machines are deployed for the master data, in this example, data 1 to data N, a target virtual machine matching each master data can be acquired from the machine pool. Data 1 can be deployed onto virtual machine 1, data 2 can be deployed onto virtual machine 2, ..., and data N can be deployed onto virtual machine N.

When virtual machines are deployed for the backup data, backup data 1 of fragment node 1 can be deployed onto virtual machine 3, backup data 1 of fragment node 2 can be deployed onto virtual machine 4, backup data 1 of fragment node 3 can be deployed onto virtual machine 1, ..., and backup data 1 of fragment node N can be deployed onto virtual machine K. Here K is less than N. Further, backup data 2 of fragment node 1 can be deployed onto virtual machine 4, ..., and backup data 2 of fragment node N can be deployed onto virtual machine I, where I is less than N. Similarly, backup data 3 of fragment node N can be deployed onto virtual machine 2, where 2 is less than N.

In this example, when virtual machines are deployed for the backup data, the backup data are not deployed on a virtual machine that belongs to a same physical machine as the target virtual machine.

It is appreciated that the numbers of pieces of data (master data and backup data) given above is exemplary. They do not constitute any limitation to the present disclosure. The numbers of pieces of data may vary in other embodiments.

According to some virtual machine deployment method embodiments provided in the present disclosure, a fragment node can be acquired by scrambling and fragmenting to-be-processed data. A data amount corresponding to the fragment node can be calculated. A target virtual machine can be allocated to the fragment node according to the data amount of the fragment node. A first virtual machine can be allocated to the backup data of the fragment node. When the target virtual machine and the first virtual machine do not belong to a same physical machine, the fragment node and the backup data can be deployed onto the target virtual machine and the first virtual machine respectively. With the embodiments of the present disclosure, when a virtual machine is allocated to a fragment node, the data amount of the fragment node can be controlled firstly by scrambling data. Then a virtual machine matching the data amount can be allocated so as to prevent the virtual machine from overloading, thereby achieving better load balancing.

Figure 7:
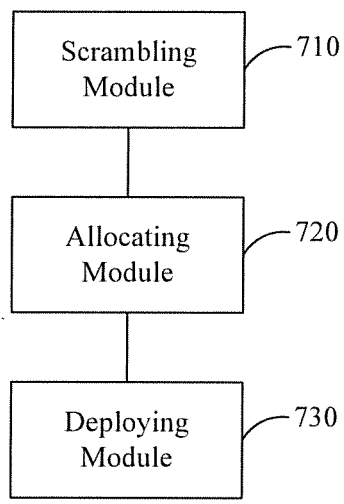
FIG. 7 is a schematic structural diagram of an exemplary virtual machine deployment apparatus according to some embodiments of the present disclosure.

FIG. 7 is a schematic structural diagram of an exemplary virtual machine deployment apparatus 700 according to some embodiments of the present disclosure. As shown in FIG. 7, the exemplary virtual machine deployment apparatus includes a scrambling module 710, an allocating module 720, and a deploying module 730.

The scrambling module 710 can be configured to acquire a fragment node by scrambling and fragmenting to-be-processed data. In some embodiments, the scrambling module 710 scrambles and fragments the to-be-processed data according to a preset scrambling algorithm to acquire the fragment node. The fragment node corresponds to scrambled fragment data. For example, the scrambling module 710 can set the number of fragments to be obtained after scrambling according to the data amount of the to-be-processed data. The scrambling module 710 can then scramble and fragment the to-be-processed data based on the preset scrambling algorithm.

The allocating module 720 can be configured to allocate a target virtual machine to the fragment node according to the data amount of the fragment node. The data amounts of the acquired fragment nodes can be different. After the fragment nodes are acquired, the data amount of each fragment node can be calculated. After the data amounts of the fragment nodes are acquired, the allocating module 720 can allocate a target virtual machine to each of the fragment nodes. For example, the target virtual machine may need to have a processing capability corresponding to the data amount included in the fragment node. The processing capability can be represented by, for example, at least one of CPU, memory, and disk performance parameters.

The deploying module 730 can be configured to deploy the fragment node onto the target virtual machine.

According to the virtual machine deployment apparatus embodiments provided in the present disclosure, a virtual machine deployment apparatus can acquire a fragment node by scrambling and fragmenting to-be-processed data. The apparatus can allocate a target virtual machine to the fragment node according to the data amount of the fragment node, and deploy the fragment node onto the target virtual machine. Accordingly, when a virtual machine is allocated to a fragment node, the data amount of the fragment node can be controlled firstly by scrambling data. Then a virtual machine matching the data amount cam be allocated so as to prevent the virtual machine from being overloaded, thereby achieving better load balancing.

Figure 8:
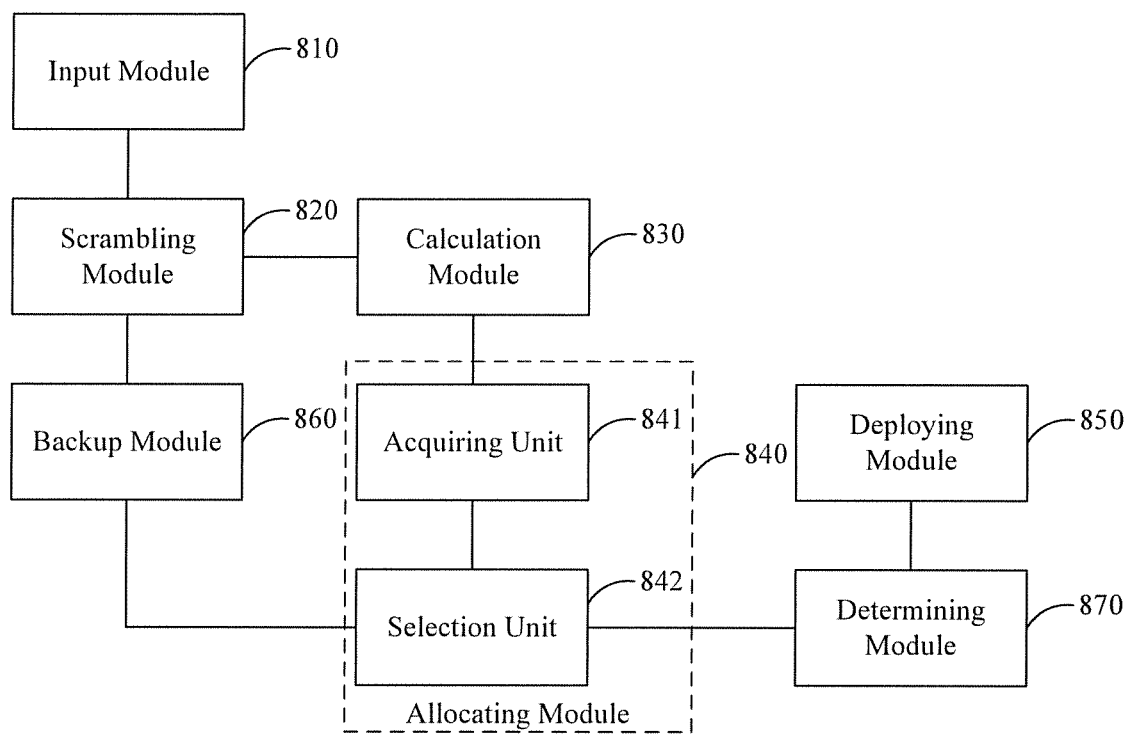
FIG. 8 is a schematic structural diagram of an exemplary virtual machine deployment apparatus according to some embodiments of the present disclosure.

FIG. 8 is a schematic structural diagram of an exemplary virtual machine deployment apparatus 800 according to some embodiments of the present disclosure. As shown in FIG. 8, the exemplary virtual machine deployment apparatus 800 includes an input module 810, a scrambling module 820, a calculation module 830, an allocating module 840, a deploying module 850, a backup module 860, and a determining module 870.

The input module 810 can be configured to input performance parameters of all virtual machines into a machine pool before the scrambling module 820 acquires the fragment node by scrambling and fragmenting the to-be-processed data.

The scrambling module 820 can be configured to acquire a fragment node by scrambling and fragmenting to-be-processed data.

The calculation module 830 can be configured to calculate the data amount corresponding to the fragment node. In some embodiments, the calculation module 830 can be configured to acquire the number of entries included in the fragment node, acquire the number of bits occupied by each piece of data in the fragment node, and calculates the data amount according to the number of entries and the number of bits occupied by each piece of data.

The allocating module 840 can be configured to allocate a target virtual machine to the fragment node according to the data amount of the fragment node.

In some embodiments, as shown in FIG. 8, the allocating module 840 can include an acquiring unit 841 and a selection unit 842.

The acquiring unit 841 can be configured to acquire, according to the data amount, a processing capability required for processing the fragment node. The processing capability can be represented by at least one of CPU, memory, and disk performance parameters. For example, the acquiring unit 841 can be configured to acquire the processing capability required for the fragment node through calculation according to a preset search feature expansion coefficient, a combined index coefficient, and the data amount. The search feature expansion coefficient, the combined index coefficient, and the data amount can be multiplied to obtain a disk size required for processing the fragment node. A corresponding memory and CPU can be selected according to the disk size.

The selection unit 842 can be configured to select, for the fragment node, the target virtual machine whose performance matches the processing capability from a machine pool. In some embodiments, the selection unit 842 can be configured to first select the target virtual machine from a low-configuration machine pool, and then gradually move on to a high-configuration machine pool to achieve an optimal configuration.

The deploying module 850 can be configured to deploy the fragment node onto the target virtual machine.

The backup module 860 can be configured to acquire backup data of the fragment node before the calculation module 830 calculates the data amount corresponding to the fragment node.

In some embodiments, the allocating module 840 can be further configured to: before the deploying module 850 deploys the fragment node onto the target virtual machine, select, for the backup data, a first virtual machine whose performance matches the processing capability from the machine pool.

The determining module 870 can be configured to determine whether the target virtual machine and the first virtual machine belong to a same physical machine.

Further, the allocating module 840 can be further configured to: when the determining module 870 determines that the target virtual machine and the first virtual machine belong to a same physical machine, reselect, for the backup data, the first virtual machine matching the processing capability from the machine pool. The reselection process can be repeated until the target virtual machine and the first virtual machine do not belong to a same physical machine.

Further, the deploying module 850 can be further configured to deploy the backup data onto the first virtual machine when the determining module determines that the target virtual machine and the first virtual machine do not belong to a same physical machine.

According to the virtual machine deployment apparatus embodiments provided in the present disclosure, a virtual machine deployment apparatus can acquire a fragment node by scrambling and fragmenting to-be-processed data. The apparatus can calculate a data amount corresponding to the fragment node, and allocate a target virtual machine to the fragment node according to the data amount of the fragment node. Further, the apparatus can back up the fragment node, and allocate a first virtual machine to the backup data. When the target virtual machine and the first virtual machine do not belong to a same physical machine, the apparatus can respectively deploy the fragment node and the backup data onto the target virtual machine and the first virtual machine. Accordingly, when a virtual machine is allocated to a fragment node, the data amount of the fragment node can be controlled firstly by scrambling data. Then a virtual machine matching the data amount can be allocated so as to prevent the virtual machine from overloading, thereby achieving better load balancing.

Based on the description above, it is appreciated that all or some of the steps or processes in the embodiments of the present disclosure can be accomplished in the form of a hardware embodiment, a software embodiment, or a computer program instructing relevant hardware components. The program may be stored in a computer-readable storage medium. When the program is executed, the steps or processes in the embodiments of the present disclosure can be performed. The storage medium can include various mediums that can store data, such as a ROM, a RAM, a magnetic disk, or an optical disc.

For example, the embodiments of the present disclosure may be in the form of a computer program product implemented on one or more computer usable storage media (including, but not limited to, a magnetic disk memory, a CD-ROM, an optical memory, and the like) including computer-readable program codes therein. The storage media can include a set of instructions for instructing a computer device (which may be a personal computer, a server, a network device, a mobile device, or the like) or a processor to perform a part of the steps of the methods described in the embodiments of the present disclosure. The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, cloud storage, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

It is appreciated that the above described embodiments are exemplary and merely used for illustrating the technical solutions of the present disclosure. They are not intended to constitute any limit on the scope of the present disclosure. Some embodiments of the present disclosure are described above in detail with reference to the accompanying drawings. Based on the disclosure, it is appreciated that modifications or variations can be made to the technical solutions set forth in the above embodiments. Further, equivalent replacements can be made with respect to some or all technical features. Such modifications, variations, or replacements shall all fall within the scope of the technical solutions of the present disclosure.

The invention claimed is:

1. A virtual machine deployment method, comprising:
   acquiring a fragment node by scrambling data;
   determining a processing capability required for processing the fragment node according to a data amount associated with the fragment node, a preset search feature expansion coefficient, and a combined index coefficient;
   selecting a target virtual machine from a machine pool, wherein a performance of the target virtual machine supports the processing capability;
   allocating the target virtual machine to the fragment node; and
   deploying the fragment node onto the target virtual machine.

2. The virtual machine deployment method according to claim 1, wherein selecting the target virtual machine from the machine pool comprises:
   in response to a candidate of the target virtual machine not being found in a low-configuration pool, selecting the target virtual machine from a high-configuration pool.

3. The virtual machine deployment method according to claim 1, further comprising:
   acquiring backup data of the fragment node.

4. A virtual machine deployment method, comprising:
   acquiring a fragment node by scrambling data;

allocating a target virtual machine to the fragment node according to a data amount associated with the fragment node;
deploying the fragment node onto the target virtual machine;
acquiring backup data of the fragment node;
selecting, from a machine pool, a first virtual machine for the backup data, a performance of the first virtual machine matching the processing capability;
determining whether the target virtual machine and the first virtual machine correspond to a same physical machine; and
in response to the target virtual machine and the first virtual machine corresponding to the same physical machine, reselecting, the first virtual machine from the machine pool; or
in response to the target virtual machine and the first virtual machine not corresponding to the same physical machine, deploying the backup data onto the first virtual machine.

5. The virtual machine deployment method according to claim 1, wherein before allocating the target virtual machine to the fragment node, the method further comprises:
determining the data amount associated with the fragment node.

6. The virtual machine deployment method according to claim 5, wherein determining the data amount associated with the fragment node comprises:
determining a number of pieces of data in the fragment node;
determining a number of bits occupied by each piece of data in the fragment node; and
determining the data amount according to the number of pieces of data and the number of bits occupied by each piece of data.

7. The virtual machine deployment method according to claim 1, wherein before acquiring the fragment node by scrambling data, the method further comprises:
inputting performance parameters of a plurality of virtual machines into the machine pool.

8. A virtual machine deployment apparatus, comprising:
a memory storing a set of instructions; and
a processor configured to execute the set of instructions to cause the virtual machine deployment apparatus to perform:
acquiring a fragment node by scrambling data;
determining a processing capability required for processing the fragment node according to a data amount associated with the fragment node, a preset search feature expansion coefficient, and a combined index coefficient;
selecting a target virtual machine from a machine pool, wherein a performance of the target virtual machine supports the processing capability;
allocating the target virtual machine to the fragment node; and
deploying the fragment node onto the target virtual machine.

9. A non-transitory computer readable medium that stores a set of instructions that is executable by at least one processor of a virtual machine deployment apparatus to cause the apparatus to perform a virtual machine deployment method, comprising:
acquiring a fragment node by scrambling data;
determining a processing capability required for processing the fragment node according to a data amount associated with the fragment node, a preset search feature expansion coefficient, and a combined index coefficient;
selecting a target virtual machine from a machine pool, wherein a performance of the target virtual machine supports the processing capability;
allocating the target virtual machine to the fragment node; and
deploying the fragment node onto the target virtual machine.

10. The non-transitory computer readable medium according to claim 9, wherein selecting the target virtual machine from the machine pool comprises:
in response to a candidate of the target virtual machine not being found in a low-configuration pool, selecting the target virtual machine from a high-configuration pool.

11. The non-transitory computer readable medium according to claim 9, wherein the set of instructions that is executable by the at least one processor of the virtual machine deployment apparatus causes the apparatus to further perform:
acquiring backup data of the fragment node.

12. A non-transitory computer readable medium storing a set of instructions that is executable by at least one processor of a virtual machine deployment apparatus to cause the apparatus to perform:
acquiring a fragment node by scrambling data;
allocating a target virtual machine to the fragment node according to a data amount associated with the fragment node;
deploying the fragment node onto the target virtual machine;
acquiring backup data of the fragment node;
selecting, from a machine pool, a first virtual machine for the backup data, a performance of the first virtual machine matching the processing capability;
determining whether the target virtual machine and the first virtual machine correspond to a same physical machine;
if the target virtual machine and the first virtual machine correspond to the same physical machine, reselecting, the first virtual machine from the machine pool; and
if the target virtual machine and the first virtual machine do not correspond to the same physical machine, deploying the backup data onto the first virtual machine.

13. The non-transitory computer readable medium according to claim 9, wherein before allocating the target virtual machine to the fragment node, the set of instructions that is executable by the at least one processor of the virtual machine deployment apparatus causes the apparatus to further perform:
determining the data amount associated with the fragment node.

14. The non-transitory computer readable medium according to claim 13, wherein determining the data amount associated with the fragment node comprises:
determining a number of pieces of data in the fragment node;
determining a number of bits occupied by each piece of data in the fragment node; and
determining the data amount according to the number of pieces of data and the number of bits occupied by each piece of data.

15. The non-transitory computer readable medium according to claim 9, wherein before acquiring the fragment node by scrambling data, the set of instructions that is executable by the at least one processor of the virtual machine deployment apparatus causes the apparatus to further perform:
 inputting performance parameters of a plurality of virtual machines into the machine pool.

16. The virtual machine deployment method according to claim 4, further comprising:
 selecting the target virtual machine from the machine pool; and
 in response to a candidate of the target virtual machine not being found in a low-configuration pool, selecting the target virtual machine from a high-configuration pool.

17. The virtual machine deployment method according to claim 4, wherein before allocating the target virtual machine to the fragment node, the method further comprises:
 determining the data amount associated with the fragment node.

18. The virtual machine deployment method according to claim 17, wherein determining the data amount associated with the fragment node comprises:
 determining a number of pieces of data in the fragment node;
 determining a number of bits occupied by each piece of data in the fragment node; and
 determining the data amount according to the number of pieces of data and the number of bits occupied by each piece of data.

19. The virtual machine deployment method according to claim 4, wherein before acquiring the fragment node by scrambling data, the method further comprises:
 inputting performance parameters of a plurality of virtual machines into the machine pool.

20. A virtual machine deployment apparatus, comprising:
 a memory storing a set of instructions; and
 a processor configured to execute the set of instructions to cause the virtual machine deployment apparatus to perform:
  acquiring a fragment node by scrambling data;
  allocating a target virtual machine to the fragment node according to a data amount associated with the fragment node;
  deploying the fragment node onto the target virtual machine;
  acquiring backup data of the fragment node;
  selecting, from a machine pool, a first virtual machine for the backup data, a performance of the first virtual machine matching the processing capability;
  determining whether the target virtual machine and the first virtual machine correspond to a same physical machine;
  if the target virtual machine and the first virtual machine correspond to the same physical machine, reselecting, the first virtual machine from the machine pool, and
  if the target virtual machine and the first virtual machine do not correspond to the same physical machine, deploying the backup data onto the first virtual machine.

21. The virtual machine deployment apparatus according to claim 20, wherein allocating the target virtual machine to the fragment node according to the data amount associated with the fragment node comprises:
 determining, according to the data amount, a processing capability required for processing the fragment node; and
 selecting the target virtual machine from the machine pool, a performance of the target virtual machine supporting the processing capability.

22. The non-transitory computer readable medium according to claim 12, wherein the set of instructions that is executable by the at least one processor of the virtual machine deployment apparatus causes the apparatus to further perform:
 selecting the target virtual machine from the machine pool; and
 if a candidate of the target virtual machine is not found in a low-configuration pool, selecting the target virtual machine from a high-configuration pool.

23. The non-transitory computer readable medium according to claim 12, wherein before allocating the target virtual machine to the fragment node, the set of instructions that is executable by the at least one processor of the virtual machine deployment apparatus causes the apparatus to further perform:
 determining the data amount associated with the fragment node.

24. The non-transitory computer readable medium according to claim 23, wherein determining the data amount associated with the fragment node comprises:
 determining a number of pieces of data in the fragment node;
 determining a number of bits occupied by each piece of data in the fragment node; and
 determining the data amount according to the number of pieces of data and the number of bits occupied by each piece of data.

25. The non-transitory computer readable medium according to claim 12, wherein before acquiring the fragment node by scrambling data, the set of instructions that is executable by the at least one processor of the virtual machine deployment apparatus causes the apparatus to further perform:
 inputting performance parameters of a plurality of virtual machines into the machine pool.

\* \* \* \* \*